US012494873B2

(12) United States Patent
Wei et al.

(10) Patent No.: US 12,494,873 B2
(45) Date of Patent: Dec. 9, 2025

(54) NARROWBAND TRANSMISSIONS WITH FINER GRANULARITY OF RESERVED RESOURCES

(71) Applicant: QUALCOMM Incorporated, San Diego, CA (US)

(72) Inventors: Chao Wei, Beijing (CN); Alberto Rico Alvarino, San Diego, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 571 days.

(21) Appl. No.: 17/636,663

(22) PCT Filed: Oct. 4, 2019

(86) PCT No.: PCT/CN2019/109828
§ 371 (c)(1),
(2) Date: Feb. 18, 2022

(87) PCT Pub. No.: WO2021/062878
PCT Pub. Date: Apr. 8, 2021

(65) Prior Publication Data
US 2022/0294580 A1   Sep. 15, 2022

(51) Int. Cl.
*H04L 5/00* (2006.01)
*H04W 72/0446* (2023.01)
*H04W 72/23* (2023.01)

(52) U.S. Cl.
CPC .......... *H04L 5/0007* (2013.01); *H04L 5/0053* (2013.01); *H04W 72/0446* (2013.01); *H04W 72/23* (2023.01)

(58) Field of Classification Search
CPC ... H04L 5/0007; H04L 5/0053; H04L 5/0048; H04L 5/0023; H04L 5/006; H04L 1/08;
(Continued)

(56) References Cited

U.S. PATENT DOCUMENTS 10,506,472 B2    12/2019  Rico Alvarino et al.
2016/0020846 A1*  1/2016  Wang ................... H04B 7/0456
                                                              370/329

(Continued)

FOREIGN PATENT DOCUMENTS

CN         104205979 A     12/2014
CN         108811139 A     11/2018
(Continued)

OTHER PUBLICATIONS

Huawei, et al., "On Coexistence Between LTE and NR," 3GPP TSG RAN WG1 Meeting #93, R1-1806888, May 21-25, 2018 (May 25, 2018), the whole document, 5 pages.
(Continued)

*Primary Examiner* — Sun Jong Kim
(74) *Attorney, Agent, or Firm* — Patterson + Sheridan, L.L.P.

(57) ABSTRACT

Techniques for narrowband transmissions with finer granularity of reserved resources. A method that may be performed by a user equipment (UE) includes receiving a configuration indicating first resource elements (REs) reserved from being used for narrowband Internet of things (NB-IoT) transmissions in a subframe; determining second REs, in the subframe, for narrowband reference signals (NRSs), based on the configuration; and processing the NRSs on the second REs in the subframe.

12 Claims, 13 Drawing Sheets

(58) Field of Classification Search
CPC ............ H04L 5/0094; H04W 72/0446; H04W 72/23; H04W 4/70
See application file for complete search history.

(56) References Cited

U.S. PATENT DOCUMENTS

| | | | |
|---|---|---|---|
| 2018/0278347 A1 | 9/2018 | Bhattad et al. | |
| 2019/0239057 A1 | 8/2019 | Hwang et al. | |
| 2020/0120545 A1* | 4/2020 | Li | H04W 28/26 |

FOREIGN PATENT DOCUMENTS

| | | | |
|---|---|---|---|
| CN | 109803320 A | 5/2019 | |
| CN | 110167165 A | 8/2019 | |
| EP | 3471330 A1 | 4/2019 | |
| EP | 3509239 A1 | 7/2019 | |
| WO | 2018085627 A1 | 5/2018 | |
| WO | 2019010655 A1 | 1/2019 | |
| WO | 2019013512 A1 | 1/2019 | |
| WO | 2019032845 A1 | 2/2019 | |
| WO | 2019148433 A1 | 8/2019 | |

OTHER PUBLICATIONS

International Search Report and Written Opinion—PCT/CN2019/109828—ISA/EPO—Jul. 8, 2020.
ZTE: "Coexistence of LTE-MTC with NR," 3GPP TSG RAN WG1 Meeting #97, R1-1906498, May 13-17, 2019 (May 17, 2019), 6 pages, the whole document.
Taiwan Search Report—TW109131529—TIPO—Sep. 14, 2023.
Supplementary European Search Report—EP19948029—Search Authority—The Hague—Jun. 5, 2023.
FUTUREWEI: "Feature Lead Summary of Coexistence of NB-IoT with NR", 3GPP TSG RAN WG1 Meeting #98, R1-1909557, Prague, Czech Republic, Aug. 26-30, 2019, 6 Pages.

* cited by examiner

Typical DL subframe

SSF configurations #3, #4 and #8

SSF configurations #9 and #10

SSF configurations #1, #2, #6, #7

NARROWBAND TRANSMISSIONS WITH FINER GRANULARITY OF RESERVED RESOURCES

CROSS-REFERENCE TO RELATED APPLICATIONS

This application is a national stage application under 35 U.S.C. 371 of PCT/CN2019/109828, filed Oct. 4, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for transmitting narrowband reference signals (NRSs) in subframes having resources reserved from being used for narrowband transmissions and for processing NRSs in subframes having resources reserved from being used for narrowband transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved coexistence of narrowband Internet of things (NB-IoT) communications with new radio (NR) communications, including improving channel estimation by NB-IoT devices and more efficient usage of transmission resources. The provided advantages also include improved coexistence of long term evolution (LTE) machine-type communications (MTC) with new radio (NR) communications, including improving channel estimation by LTE-MTC devices and more efficient usage of transmission resources.

Certain aspects provide a method for wireless communication by a user equipment (UE). The method generally includes receiving a configuration indicating first resource elements (REs) reserved from being used for narrowband Internet of things (NB-IoT) transmissions in a subframe; determining second REs, in the subframe, for narrowband reference signals (NRSs), based on the configuration; and processing the NRSs on the second REs in the subframe.

Certain aspects provide a method for wireless communication by a base station (BS). The method generally includes transmitting a configuration indicating first resource elements (REs) reserved from being used for narrowband Internet of things (NB-IoT) transmissions in a subframe; determining second REs, in the subframe, for narrowband reference signals (NRSs), based on the configuration; and transmitting the NRSs on the second REs in the subframe.

Certain aspects provide a method for wireless communication by a user equipment (UE). The method generally includes receiving a configuration indicating first resource elements (REs) reserved from being used for machine-type communications (MTC) transmissions in a subframe; determining second REs, in the subframe, for demodulation reference signals (DMRSs), based on the configuration; and processing the DMRSs on the second REs in the subframe.

Certain aspects provide a method for wireless communication by a base station (BS). The method generally includes transmitting a configuration indicating first resource elements (REs) reserved from being used for machine-type communications (MTC) transmissions in a subframe; determining second REs, in the subframe, for demodulation reference signals (DMRSs), based on the configuration; and transmitting the DMRSs on the second REs in the subframe.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
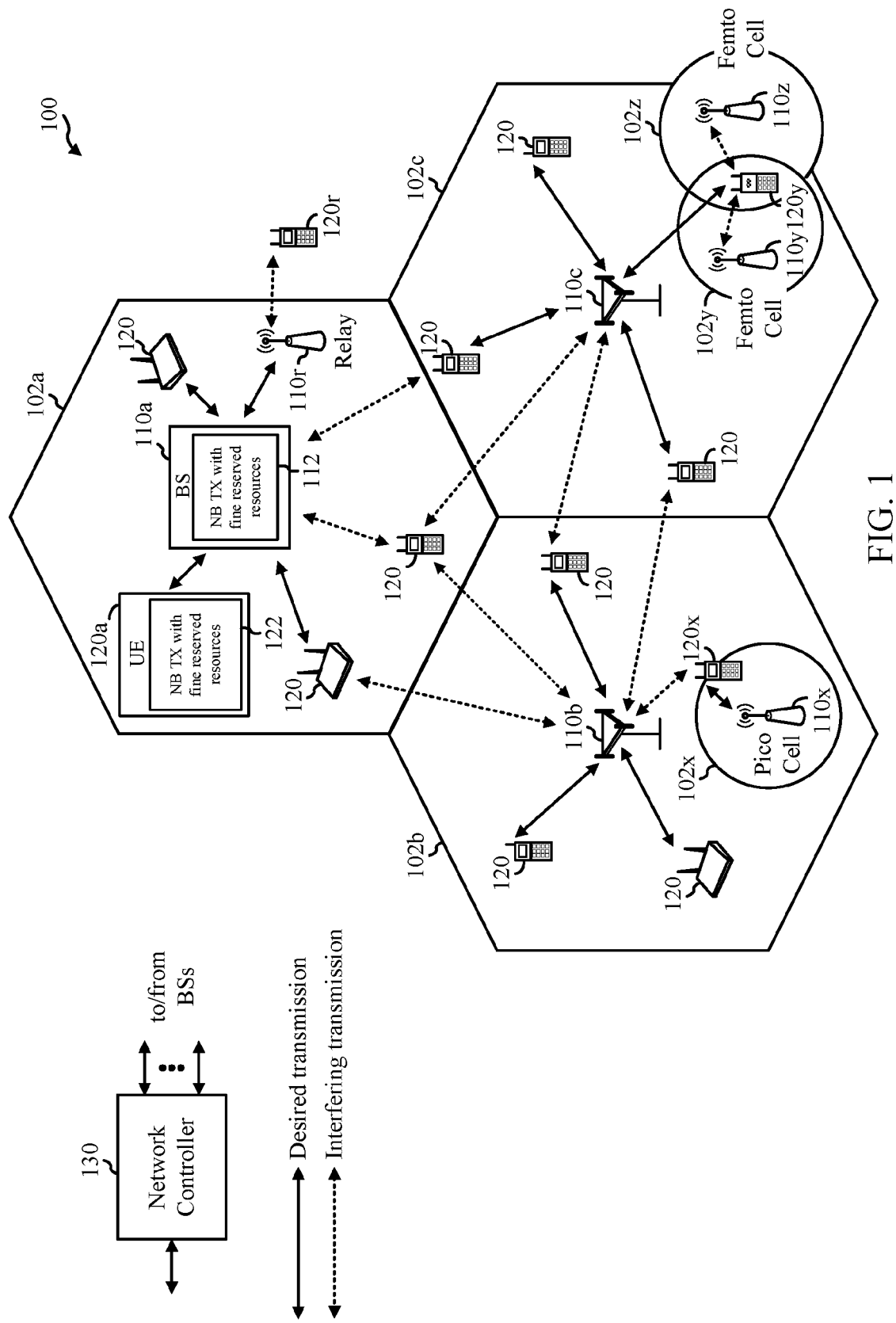
FIG. 1 is a block diagram conceptually illustrating an example telecommunications system, in accordance with certain aspects of the present disclosure.

Aspects of the present disclosure provide apparatus, methods, processing systems, and computer readable mediums for improved coexistence of narrowband Internet of things (NB-IoT) communications with new radio (NR) communications, including improving channel estimation by NB-IoT devices and more efficient usage of transmission resources. In previously-known techniques, such as Long Term Evolution (LTE) systems, subframe level resource reservation is supported for narrowband Internet of things (NB-IoT) communications or for LTE machine-type communications (LTE-MTC). That is, valid subframes for NB-IoT transmission in an LTE communications system may be indicated by a bitmap, and other subframes are considered reserved for non-NB-IoT communications. Similarly, valid subframes for MTC transmission in an LTE communications system may be indicated by a bitmap, and other subframes are considered reserved for non-MTC communications. The bitmap may have a size of either 10 ms or 40 ms, depending on the deployment mode of the communications system. Aspects of the present disclosure may enable NR communications systems to coexist with NB-IoT communications or LTE-MTC communications while using finer granularity resource reservation, such as symbol-level or slot-level resource reservation for the NB-IoT communications or for the LTE-MTC communications. In NR communications systems supporting finer granularity resource reservations, NB-IoT transmissions or LTE-MTC transmissions may occur in only a portion of a subframe, instead of an entire subframe, as in the previously known techniques. Allowing finer granularity reservations may be useful in some cases when NR uses a different numerology from NB-IoT communications or LTE-MTC communications, such as 30 kHz subcarrier spacing (SCS) that NR may occasionally use. In addition, when using the previously known subframe level resource reservation technique, NB-IoT transmissions are not allowed in a subframe in which one of the associated two slots is used for uplink (UL) and the other slot is used for downlink (DL).

In aspects of the present disclosure, when finer granularity resource reservation is configured, narrowband transmissions, such as narrowband physical downlink control channels (NPDCCHs), narrowband physical downlink shared channels (NPDSCHs), or long term evolution machine-type communications (LTE-MTC) transmissions, on the reserved resources are dropped (i.e., not transmitted). Aspects of the present disclosure provide techniques for determining whether narrowband reference signals (NRSs) or demodulation reference signals (DMRS) are also dropped, if the reserved resources include symbols assigned for transmitting NRSs or DMRSs.

According to aspects of the present disclosure, in a typical DL subframe, NRSs are transmitted in symbols 5, 6, 12, and 13 on certain subcarriers. That is, resource elements (REs) for NRS occur in symbols 5, 6, 12, and 13 of a typical DL subframe. When one or more NRS symbols (i.e., symbols 5, 6, 12, or 13 in a typical DL subframe) are configured as reserved resources not for NB-IoT DL transmission, puncturing the NRS on those reserved resources implies a significant change to DL channel estimation based on NRS. For example, a UE may support DL channel estimation based on 2, 4, or 6 NRS REs in a subframe in order to accurately estimate the channel, depending on the number of available NRS symbols in the subframe. In addition, puncturing NRS may significantly degrade communications performance in low signal-to-noise ratio (SNR) regimes, where the communications performance is strongly influenced by channel estimation.

The following description provides examples of narrowband transmissions with finer granularity of reserved resources in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for transmitting or processing narrowband reference signals (NRSs) in subframes having resources reserved from being used for narrowband transmissions. As shown in FIG. 1, the BS 110a includes a NB TX with fine reserved resources manager 112. The NB TX with fine reserved resources manager 112 may be configured to receive a configuration indicating first resource elements (REs) reserved from being used for narrowband Internet of things (NB-IoT) transmissions in a subframe; determine second REs, in the subframe, for narrowband reference signals (NRSs), based on the configuration; and process the NRSs on the second REs in the subframe, in accordance with aspects of the present disclosure. In some examples, the NB TX with fine reserved resources manager 112 may receive a configuration indicating first resource elements (REs) reserved from being used for machine-type communications (MTC) transmissions in a subframe; determine second REs, in the subframe, for demodulation reference signals (DMRSs), based on the configuration; and process the DMRSs on the second REs in the subframe. As shown in FIG. 1, the UE 120a includes a NB TX with fine reserved resources manager 122. The NB TX with fine reserved resources manager 122 may be configured to receiving a configuration indicating first resource elements (REs) reserved from being used for narrowband Internet of things (NB-IoT) transmissions in a subframe; determining second REs, in the subframe, for narrowband reference signals (NRSs), based on the configuration; and processing the NRSs on the second REs in the subframe, in accordance with aspects of the present disclosure. In some examples, the NB TX with fine reserved resources manager 122 may transmit a configuration indicating first resource elements (REs) reserved from being used for machine-type communications (MTC) transmissions in a subframe; determine second REs, in the subframe, for demodulation reference signals (DMRSs), based on the configuration; and transmit the DMRSs on the second REs in the subframe.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
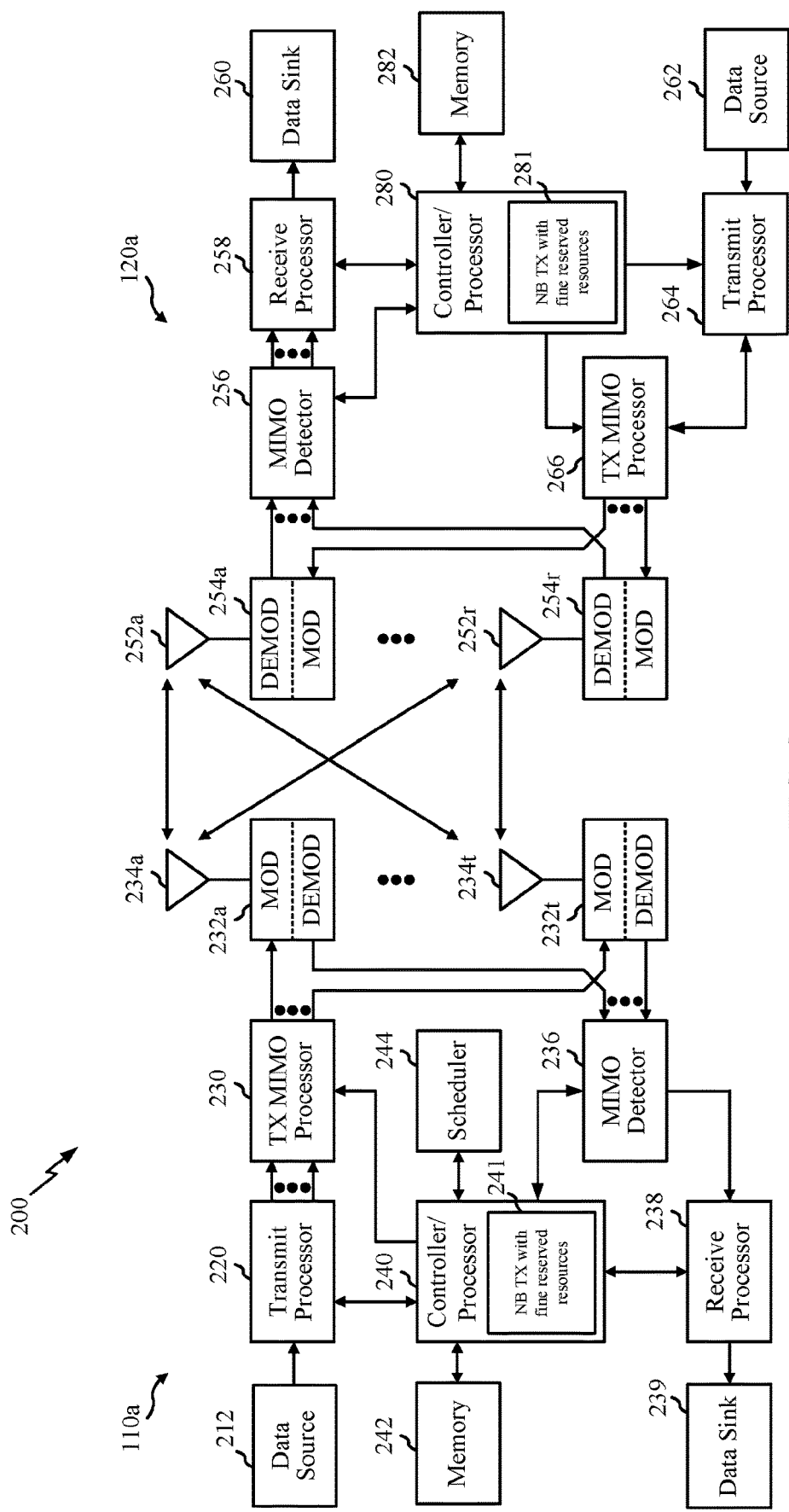
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has an NB TX with fine reserved resources manager 241 that may be configured for transmitting a configuration indicating first resource elements (REs) reserved from being used for narrowband Internet of things (NB-IoT) transmissions in a subframe; determining second REs, in the subframe, for narrowband reference signals (NRSs), based on the configuration; and transmitting the NRSs on the second REs in the subframe, according to aspects described herein. The NB TX with fine reserved resources manager 241 may also be configured for transmitting a configuration indicating first resource elements (REs) reserved from being used for machine-type communications (MTC) transmissions in a subframe; determining second REs, in the subframe, for demodulation reference signals (DMRSs), based on the configuration; and transmitting the DMRSs on the second REs in the subframe, according to aspects described herein. As shown in FIG. 2, the controller/processor 280 of the UE 120a has an NB TX with fine reserved resources manager 281 that may be configured for receiving a configuration indicating first resource elements (REs) reserved from being used for narrowband Internet of things (NB-IoT) transmissions in a subframe; determining second REs, in the subframe, for narrowband reference signals (NRSs), based on the configuration; and processing the NRSs on the second REs in the subframe, according to aspects described herein. The NB TX with fine reserved resources manager 281 may also be configured for receiving a configuration indicating first resource elements (REs) reserved from being used for machine-type communications (MTC) transmissions in a subframe; determining second REs, in the subframe, for demodulation reference signals (DMRSs), based on the configuration; and; and processing the DMRSs on the second REs in the subframe, according to aspects described herein. Although shown at the Controller/Processor, other components of the UE 120a and BS 110a may be used performing the operations described herein.

As mentioned above, in previously-known techniques, such as Long Term Evolution (LTE) systems, subframe level resource reservation is supported for narrowband Internet of things (NB-IoT) communications or for LTE machine-type communications (LTE-MTC). That is, valid subframes for NB-IoT transmission in an LTE communications system may be indicated by a bitmap, and other subframes are considered reserved for non-NB-IoT communications. Similarly, valid subframes for MTC transmission in an LTE communications system may be indicated by a bitmap, and other subframes are considered reserved for non-MTC communications. The bitmap may have a size of either 10 ms or 40 ms, depending on the deployment mode of the communications system. Aspects of the present disclosure may enable NR communications systems to coexist with NB-IoT communications or LTE-MTC communications while using finer granularity resource reservation, such as symbol-level or slot-level resource reservation for the NB-IoT communications or for the LTE-MTC communications. In NR communications systems supporting finer granularity resource reservations, NB-IoT transmissions or LTE-MTC transmissions may occur in only a portion of a subframe, instead of an entire subframe, as in the previously known techniques. Allowing finer granularity reservations may be useful in some cases when NR uses a different numerology from NB-IoT communications or LTE-MTC communications, such as 30 kHz subcarrier spacing (SCS) that NR may occasionally use. In addition, when using the previously known subframe level resource reservation technique, NB-IoT transmissions are not allowed in a subframe in which one of the associated two slots is used for uplink (UL) and the other slot is used for downlink (DL).

In aspects of the present disclosure, when finer granularity resource reservation is configured, narrowband transmissions, such as narrowband physical downlink control channels (NPDCCHs), narrowband physical downlink shared channels (NPDSCHs), or long term evolution machine-type communications (LTE-MTC) transmissions, on the reserved resources are dropped (i.e., not transmitted). Aspects of the present disclosure provide techniques for determining whether narrowband reference signals (NRSs) or demodulation reference signals (DMRS) are also dropped, if the reserved resources include symbols assigned for transmitting NRSs or DMRSs.

Figure 3:
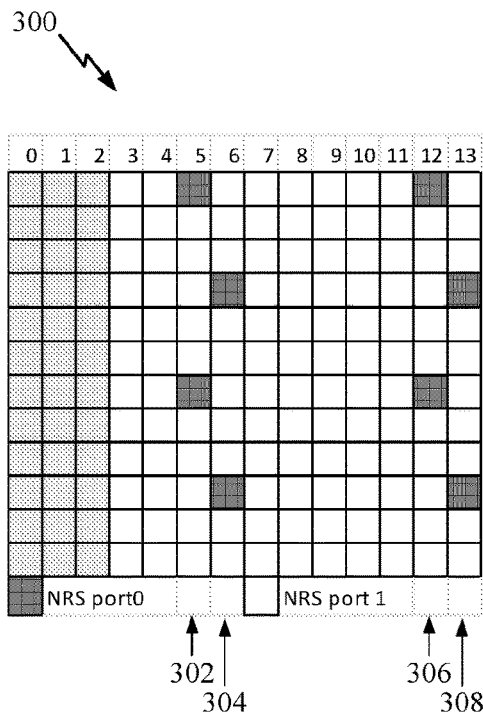
FIG. 3 illustrates example subframe configurations, according to previously known techniques.
Figure 3:
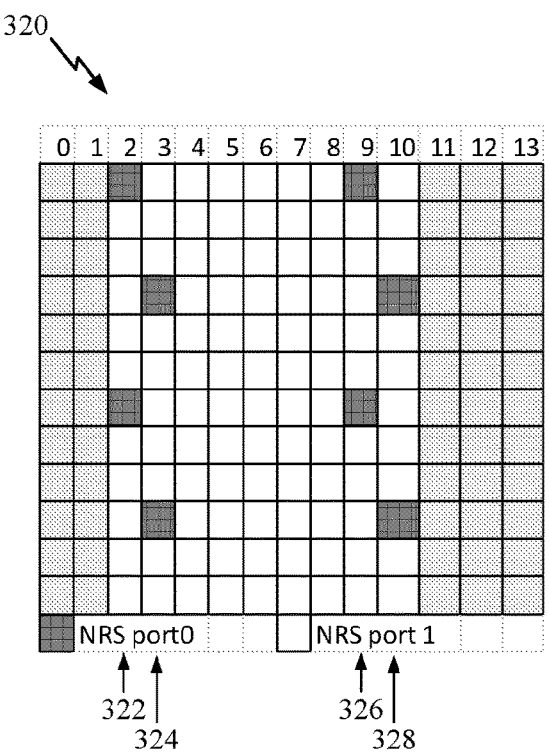
Figure 3:
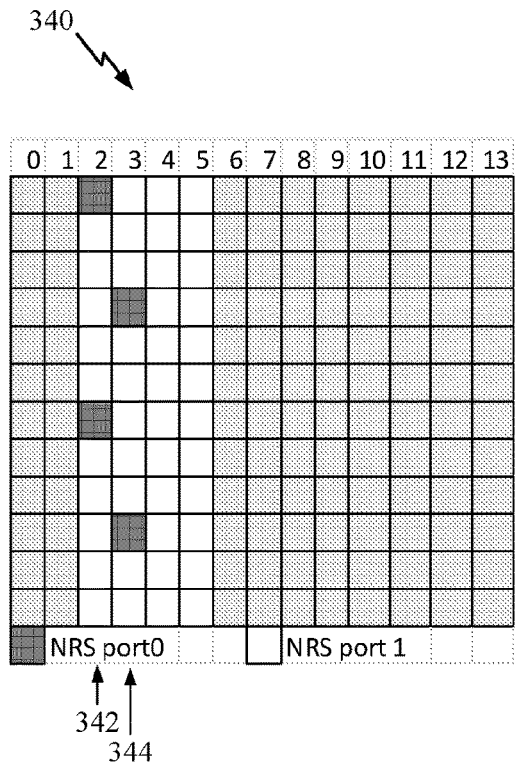
Figure 3:
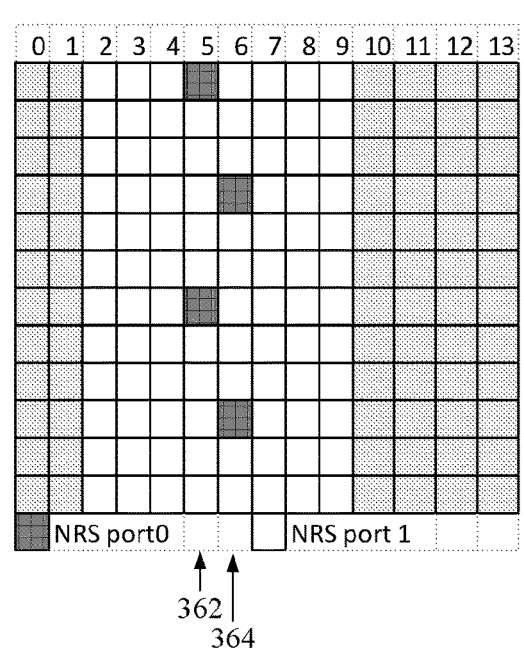

FIG. 3 illustrates example subframe configurations 300, 320, 340, and 360, according to previously known techniques. As illustrated in subframe configuration 300, in a typical DL subframe, NRSs are transmitted in the sixth and seventh symbols of each slot at 302, 304, 306, and 308, on certain subcarriers. That is, resource elements (REs) for NRS occur in the sixth and seventh symbols of each slot of a typical DL subframe. In special subframes (SSF), which occur between downlink subframes and uplink subframes in a time-division duplex (TDD) communications system, some symbols are not used for DL transmissions, and so NRSs are transmitted in other symbols of the SSF subframes. As illustrated in subframe configuration 320, for SSF configurations #3, #4, and #8, NRSs are transmitted in the third and fourth symbols of each slot at 322, 324, 326, and 328. As illustrated in subframe configuration 340, for SSF configurations #9 and #10, NRSs are transmitted in the third and fourth symbols of the first slot at 342 and 344. As illustrated in subframe configuration 360, for SSF configurations #1, #2, #6 and #7, NRS are transmitted in the sixth and seventh symbols of the first slot at 362 and 364. For SSF configuration #0 and #5 (not shown), NRS are not transmitted.

When one or more NRS symbols (i.e., symbols 5, 6, 12, or 13 in a typical DL subframe) are configured as reserved resources not for NB-IoT DL transmission, puncturing the NRS on those reserved resources implies a significant change to DL channel estimation based on NRS. For example, a UE may support DL channel estimation based on 2, 4, or 6 NRS REs in a subframe in order to accurately estimate the channel, depending on the number of available NRS symbols in the subframe. In addition, puncturing NRS may significantly degrade communications performance in low signal-to-noise ratio (SNR) regimes, where the communications performance is strongly influenced by channel estimation.

Accordingly, what is needed are techniques and apparatus for transmitting narrowband reference signals (NRSs) in subframes having resources reserved from being used for narrowband transmissions and for processing NRSs in subframes having resources reserved from being used for narrowband transmissions.

Example Narrowband Transmissions with Finer Granularity of Reserved Resources

Figure 4:
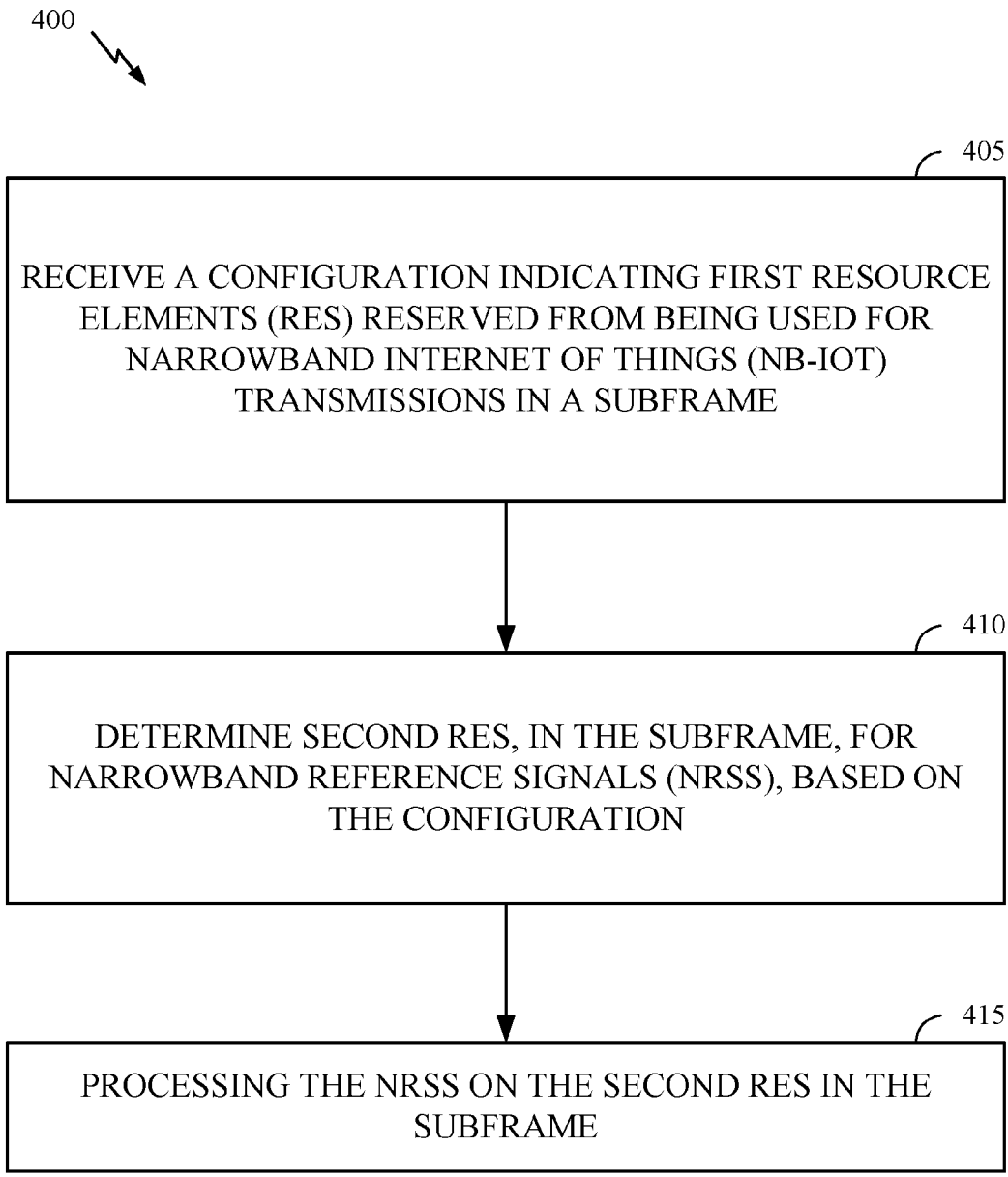
FIG. 4 is a flow diagram illustrating example operations for wireless communication by a UE, in accordance with certain aspects of the present disclosure.

Aspects of the present disclosure provide techniques and apparatus for transmitting narrowband reference signals (NRSs) in subframes having resources reserved from being used for narrowband transmissions and for processing NRSs in subframes having resources reserved from being used for narrowband transmissions FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by the UE receiving a configuration indicating first resource elements (REs) reserved from being used for narrowband Internet of things (NB-IoT) transmissions in a subframe.

At block 410, operations 400 continue with the UE determining second REs, in the subframe, for narrowband reference signals (NRSs), based on the configuration.

Operations 415 continue, at block 415, with the UE processing the NRSs on the second REs in the subframe.

According to aspects of the present disclosure, determining the second REs (i.e., as shown in block 410 of FIG. 4) may include determining one or more of the first REs as the second REs, and the UE may ignore downlink NB-IoT transmissions other than the NRSs in same symbol periods as the second REs.

In aspects of the present disclosure, determining the second REs (i.e., as shown in block 410 of FIG. 4) may include determining the first REs include one or more symbols for NRSs and determining, based on the first REs including one or more symbols for the NRSs, that there are zero NRSs in the subframe. Processing the NRSs on the second REs (i.e., as shown in block 415 of FIG. 4) may include refraining from estimating a channel based on the zero NRSs in the subframe.

According to aspects of the present disclosure, determining the second REs (i.e., as shown in block 410 of FIG. 4) may include determining the first REs include one or more symbols for NRSs in a slot of the subframe and determining, based on the first REs including one or more symbols for the NRSs in the slot, that there are zero NRSs in the slot. Processing the NRSs on the second REs (i.e., as shown in block 415 of FIG. 4) may include refraining from estimating a channel based on the zero NRSs in the slot.

In aspects of the present disclosure, determining the second REs (i.e., as shown in block 410 of FIG. 4) may be based on time domain locations of the first REs.

According to aspects of the present disclosure, determining the second REs (i.e., as shown in block 410 of FIG. 4) may be based on the time domain location of the first REs and may include: when the first REs do not comprise a sixth symbol and a seventh symbol in each of a first slot and a second slot of the subframe, determining that the second REs are in the sixth symbol and the seventh symbol of each of the first slot and the second slot. In aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; and when the first REs do not comprise a third symbol and a fourth symbol in each of the first slot and the second slot; determining that the second REs are in the third symbol and the fourth symbol in each of the first slot and the second slot. According to aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; when the first REs comprise at least one of the third symbol in the first slot, the fourth symbol in the first slot, the third symbol in the second slot, or the fourth symbol in the second slot; and when the first REs do not comprise the sixth symbol and the seventh symbol in one of the first slot and the second slot; determining that the second REs are in the sixth symbol and the seventh symbol in the one of the first slot and the second slot and not in the other slot of the first slot and the second slot. In aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot, the fourth symbol in the first slot, the third symbol in the second slot, or the fourth symbol in the second slot; and when the first REs do not comprise the third symbol and the fourth symbol in one of the first slot and the second slot; determining that the second REs are in the third symbol and the fourth symbol in the one of the first slot and the second slot and not in the other slot of the first slot and the second slot. According to aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot or the fourth symbol in the first slot; and when the first REs comprise at least one of the third symbol in the second slot or the fourth symbol in the second slot; determining that there are zero second REs in the subframe. Processing the NRSs on the second REs may include refraining from estimating a channel based on the zero second REs.

In aspects of the present disclosure, a UE performing operations 400 may receive one or more repetitions of a narrowband physical downlink control channel (NPDCCH) or a narrowband physical downlink shared channel (NPDSCH) transmission in the subframe and a subsequent subframe. According to aspects of the present disclosure, the UE may then determine third REs of the subframe and the subsequent subframe for the NPDCCH or the NPDSCH transmission based on a default NRS configuration, wherein transmission of NPDCCH or NPDSCH in the subframe is punctured on the second REs.

Figure 5:
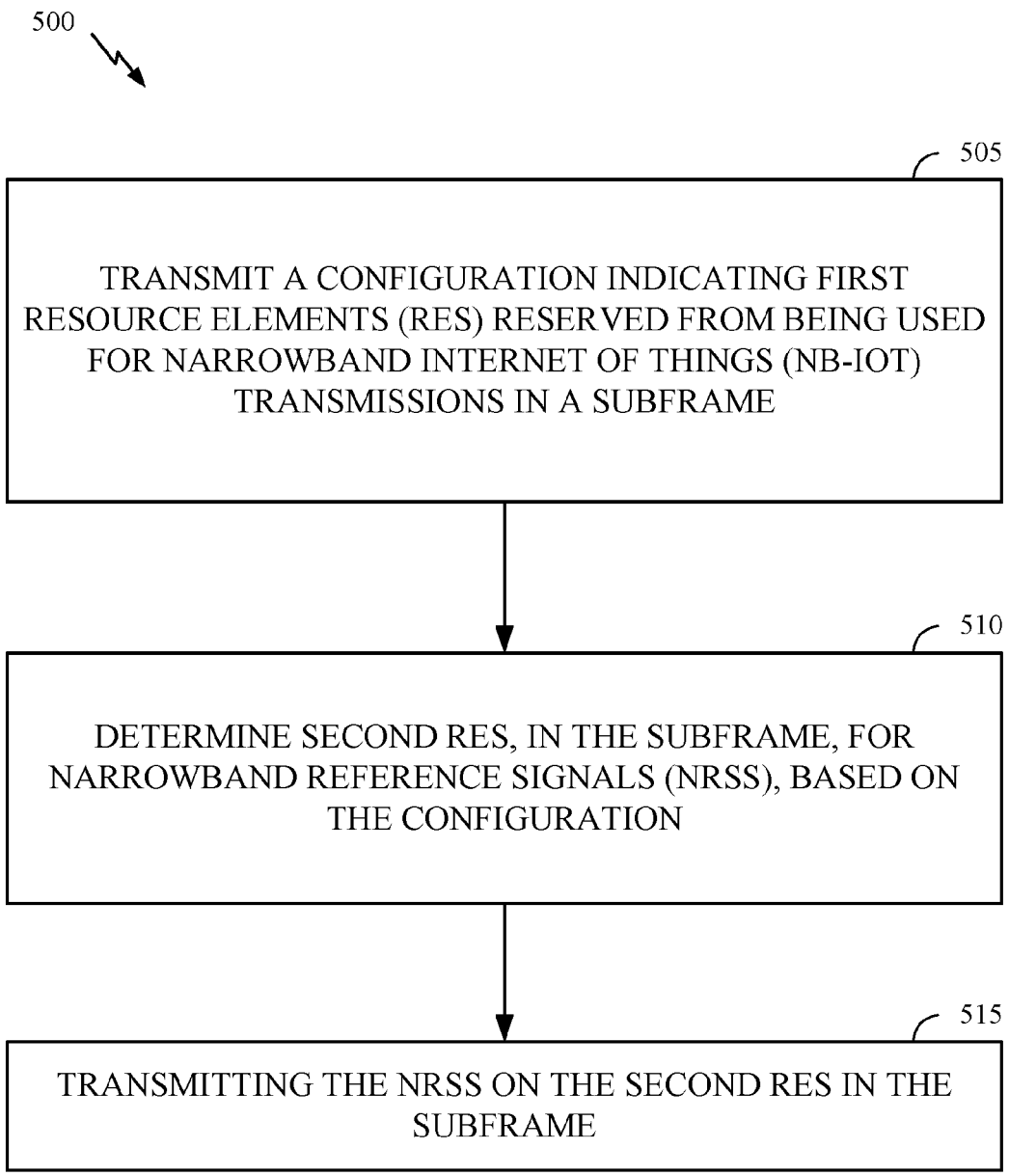
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). The operations 500 may be complementary operations by the UE to the operations 400 performed by the BS. Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, by the BS transmitting a configuration indicating first resource elements (REs) reserved from being used for narrowband Internet of things (NB-IoT) transmissions in a subframe.

At block 510, operations 500 continue with the BS determining second REs, in the subframe, for narrowband reference signals (NRSs), based on the configuration.

Operations 500 continue, at block 515, with the BS transmitting the NRSs on the second REs in the subframe.

According to aspects of the present disclosure, determining the second REs (i.e., as described above in block 510 of FIG. 5) may include determining one or more of the first REs as the second REs. The BS may then drop downlink NB-IoT transmissions, other than the NRSs, scheduled in same symbol periods as the second REs.

In aspects of the present disclosure, determining the second REs (i.e., as described above in block 510 of FIG. 5) may include determining the first REs comprise one or more symbols for NRSs and determining, based on the first REs comprising one or more symbols for the NRSs, that there are zero NRSs in the subframe.

According to aspects of the present disclosure, determining the second REs (i.e., as described above in block 510 of FIG. 5) may include determining the first REs comprise one or more symbols for NRSs in a slot of the subframe and determining, based on the first REs comprising one or more symbols for the NRSs in the slot, that there are zero NRSs in the slot.

In aspects of the present disclosure, determining the second REs (i.e., as described above in block 510 of FIG. 5) may be based on time domain locations of the first REs. According to aspects of the present disclosure, determining the second REs based on the time domain location of the first REs may include when the first REs do not comprise a sixth symbol and a seventh symbol in each of a first slot and a second slot of the subframe, determining that the second REs are in the sixth symbol and the seventh symbol of each of the first slot and the second slot. In aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; and when the first REs do not comprise a third symbol and a fourth symbol in each of the first slot and the second slot; determining that the second REs are in the third symbol and the fourth symbol in each of the first slot and the second slot. According to aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; when the first REs comprise at least one of the third symbol in the first slot, the fourth symbol in the first slot, the third symbol in the second slot, or the fourth symbol in the second slot; and when the first REs do not comprise the sixth symbol and the seventh symbol in one of the first slot and the second slot; determining that the second REs are in the sixth symbol and the seventh symbol in the one of the first slot and the second slot and not in the other slot of the first slot and the second slot. In aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot, the fourth symbol in the first slot, the third symbol in the second slot, or the fourth symbol in the second slot; and when the first REs do not comprise the third symbol and the fourth symbol in one of the first slot and the second slot; determining that the second REs are in the third symbol and the fourth symbol in the one of the first slot and the second slot and not in the other slot of the first slot and the second slot. According to aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot or the fourth symbol in the first slot; and when the first REs comprise at least one of the third symbol in the second slot or the fourth symbol in the second slot; determining that there are zero second REs in the subframe.

In aspects of the present disclosure, a BS performing operations 500 may transmit one or more repetitions of a narrowband physical downlink control channel (NPDCCH) or a narrowband physical downlink shared channel (NPDSCH) transmission in the subframe and a subsequent subframe. According to aspects of the present disclosure, the BS may then determine third REs of the subframe and the subsequent subframe for the NPDCCH or NPDSCH transmissions based on a default NRS configuration, wherein transmission of the NB-PDCCH or the NB-PDSCH in the subframe is punctured on the second REs.

Figure 6:
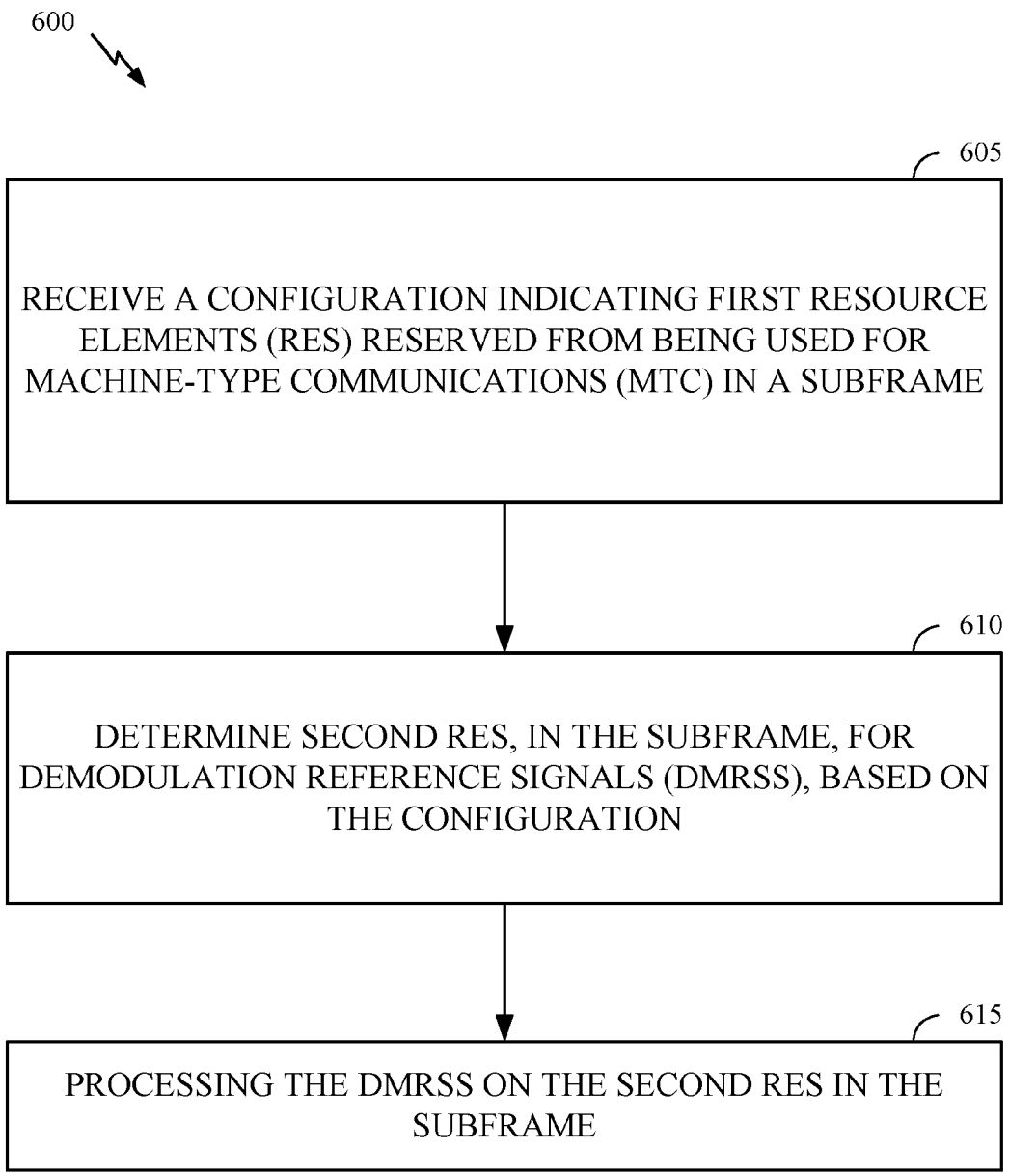
FIG. 6 is a flow diagram illustrating example operations for wireless communication by a UE, in accordance with certain aspects of the present disclosure.

Aspects of the present disclosure provide techniques and apparatus for transmitting demodulation reference signals (DMRSs) in subframes having resources reserved from being used for MTC transmissions and for processing DMRSs in subframes having resources reserved from being used for MTC transmissions FIG. 6 is a flow diagram illustrating example operations 600 for wireless communication, in accordance with certain aspects of the present disclosure. The operations 600 may be performed, for example, by a UE (e.g., such as a UE 120a in the wireless communication network 100). Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, by the UE receiving a configuration indicating first resource elements (REs) reserved from being used for machine-type communications (MTC) transmissions in a subframe.

At block 610, operations 600 continue with the UE determining second REs, in the subframe, for demodulation reference signals (DMRSs), based on the configuration.

Operations 615 continue, at block 615, with the UE processing the DMRSs on the second REs in the subframe.

According to aspects of the present disclosure, determining the second REs (i.e., as shown in block 610 of FIG. 6) may include determining one or more of the first REs as the second REs, and the UE may ignore downlink MTC transmissions other than the DMRSs in same symbol periods as the second REs.

In aspects of the present disclosure, determining the second REs (i.e., as shown in block 610 of FIG. 6) may include determining the first REs include one or more symbols for DMRSs and determining, based on the first REs including one or more symbols for the DMRSs, that there are zero DMRSs in the subframe. Processing the DMRSs on the second REs (i.e., as shown in block 615 of FIG. 6) may include ignoring an MTC transmission in the subframe.

According to aspects of the present disclosure, determining the second REs (i.e., as shown in block 610 of FIG. 6) may include determining the first REs include one or more symbols for DMRSs in a slot of the subframe and determining, based on the first REs including one or more symbols for the DMRSs in the slot, that there are zero DMRSs in the slot. Processing the DMRSs on the second REs (i.e., as shown in block 615 of FIG. 6) may include receiving an MTC transmission in the slot and another slot of the subframe based on DMRSs in the other slot of the subframe.

In aspects of the present disclosure, determining the second REs (i.e., as shown in block 610 of FIG. 6) may be based on time domain locations of the first REs.

According to aspects of the present disclosure, determining the second REs (i.e., as shown in block 610 of FIG. 6) may be based on the time domain location of the first REs and may include: when the first REs do not comprise a sixth symbol and a seventh symbol in each of a first slot and a second slot of the subframe, determining that the second REs are in the sixth symbol and the seventh symbol of each of the first slot and the second slot. In aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; and when the first REs do not comprise a third symbol and a fourth symbol in each of the first slot and the second slot; determining that the second REs are in the third symbol and the fourth symbol in each of the first slot and the second slot. According to aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; when the first REs comprise at least one of the third symbol in the first slot, the fourth symbol in the first slot, the third symbol in the second slot, or the fourth symbol in the second slot; and when the first REs do not comprise the sixth symbol and the seventh symbol in one of the first slot and the second slot; determining that the second REs are in the sixth symbol and the seventh symbol in the one of the first slot and the second slot and not in the other slot of the first slot and the second slot. In aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot, the fourth symbol in the first slot, the third symbol in the second slot, or the fourth symbol in the second slot; and when the first REs do not comprise the third symbol and the fourth symbol in one of the first slot and the second slot; determining that the second REs are in the third symbol and the fourth symbol in the one of the first slot and the second slot and not in the other slot of the first slot and the second slot. According to aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot or the fourth symbol in the first slot; and when the first REs comprise at least one of the third symbol in the second slot or the fourth symbol in the second slot; determining that there are zero second REs in the subframe. Processing the DMRSs on the second REs may include ignoring an MTC transmission in the subframe.

In aspects of the present disclosure, a UE performing operations 600 may receive one or more repetitions of an MTC physical downlink control channel (PDCCH) or an MTC physical downlink shared channel (PDSCH) transmission in the subframe and a subsequent subframe. According to aspects of the present disclosure, the UE may then determine third REs of the subframe and the subsequent subframe for the MTC PDCCH or the MTC PDSCH transmission based on a default DMRS configuration, wherein transmission of the MTC PDCCH or the MTC PDSCH in the subframe is punctured on the second REs.

Figure 7:
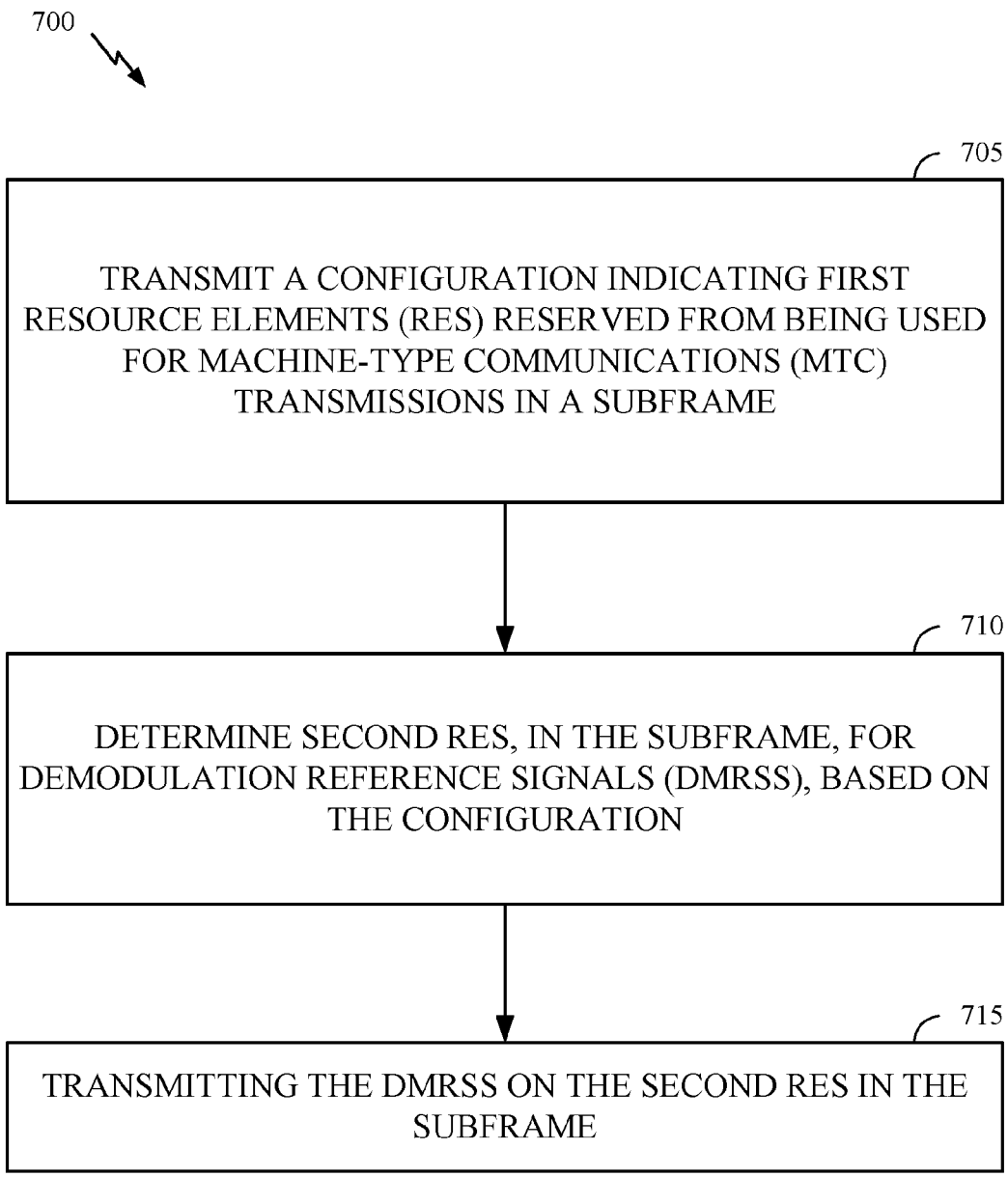
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., such as the BS 110a in the wireless communication network 100). The operations 700 may be complementary operations by the UE to the operations 600 performed by the BS. Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at block 705, by the BS transmitting a configuration indicating first resource elements (REs) reserved from being used for machine-type communications (MTC) transmissions in a subframe.

At block 710, operations 700 continue with the BS determining second REs, in the subframe, for demodulation reference signals (DMRSs), based on the configuration.

Operations 700 continue, at block 715, with the BS transmitting the DMRSs on the second REs in the subframe.

According to aspects of the present disclosure, determining the second REs (i.e., as described above in block 710 of FIG. 7) may include determining one or more of the first REs as the second REs. The BS may then drop downlink NB-IoT transmissions, other than the DMRSs, scheduled in same symbol periods as the second REs.

In aspects of the present disclosure, determining the second REs (i.e., as described above in block 710 of FIG. 7) may include determining the first REs comprise one or more symbols for DMRSs and determining, based on the first REs comprising one or more symbols for the DMRSs, that there are zero DMRSs in the subframe.

According to aspects of the present disclosure, determining the second REs (i.e., as described above in block 710 of FIG. 7) may include determining the first REs comprise one or more symbols for DMRSs in a slot of the subframe and determining, based on the first REs comprising one or more symbols for the DMRSs in the slot, that there are zero DMRSs in the slot.

In aspects of the present disclosure, determining the second REs (i.e., as described above in block 710 of FIG. 7) may be based on time domain locations of the first REs. According to aspects of the present disclosure, determining the second REs based on the time domain location of the first REs may include when the first REs do not comprise a sixth symbol and a seventh symbol in each of a first slot and a second slot of the subframe, determining that the second REs are in the sixth symbol and the seventh symbol of each of the first slot and the second slot. In aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; and when the first REs do not comprise a third symbol and a fourth symbol in each of the first slot and the second slot; determining that the second REs are in the third symbol and the fourth symbol in each of the first slot and the second slot. According to aspects of the present disclosure, determining the second REs based on the time domain location of the first REs may further include when the first REs comprise at least one of the sixth symbol in the first slot, the seventh symbol in the first slot, the sixth symbol in the second slot, or the seventh symbol in the second slot; when the first REs comprise at least one of the third symbol in the first slot, the fourth symbol in the first slot, the third symbol in the second slot, or the fourth symbol in the second slot; and when the first REs do not comprise the sixth symbol and the seventh symbol in one of the first slot and the second slot; determining that the second REs are in the sixth symbol and the seventh symbol in the one of the first slot and the second slot and not in the other slot of the first slot and the second slot. In aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot, the fourth symbol in the first slot, the third symbol in the second slot, or the fourth symbol in the second slot; and when the first REs do not comprise the third symbol and the fourth symbol in one of the first slot and the second slot; determining that the second REs are in the third symbol and the fourth symbol in the one of the first slot and the second slot and not in the other slot of the first slot and the second slot. According to aspects of the present disclosure, determining the second REs based on the time domain location of the first REs may further include when the first REs comprise at least one of the sixth symbol in the first slot or the seventh symbol in the first slot; when the first REs comprise at least one of the sixth symbol in the second slot or the seventh symbol in the second slot; when the first REs comprise at least one of the third symbol in the first slot or the fourth symbol in the first slot; and when the first REs comprise at least one of the third symbol in the second slot or the fourth symbol in the second slot; determining that there are zero second REs in the subframe.

In aspects of the present disclosure, a BS performing operations 700 may transmit one or more repetitions of a narrowband physical downlink control channel (NPDCCH) or a narrowband physical downlink shared channel (NPDSCH) transmission in the subframe and a subsequent subframe. According to aspects of the present disclosure, the BS may then determine third REs of the subframe and the subsequent subframe for the NPDCCH or NPDSCH transmissions based on a default DMRS configuration, wherein transmission of the NB-PDCCH or the NB-PDSCH in the subframe is punctured on the second REs.

According to aspects of the present disclosure, three techniques for NRS or DMRS transmission and NRS or DMRS processing in a subframe with finer granularity reserved resources are provided.

In some implementations of the present disclosure, NRS are transmitted in the same REs as NRS are transmitted in a subframe without finer granularity reserved resources. In this technique, DL transmissions other than NRS on the reserved resources are dropped.

In some implementations of the present disclosure, DMRS are transmitted in the same REs as DMRS are transmitted in a subframe without finer granularity reserved resources. In this technique, DL transmissions other than DMRS on the reserved resources are dropped.

Figure 8:
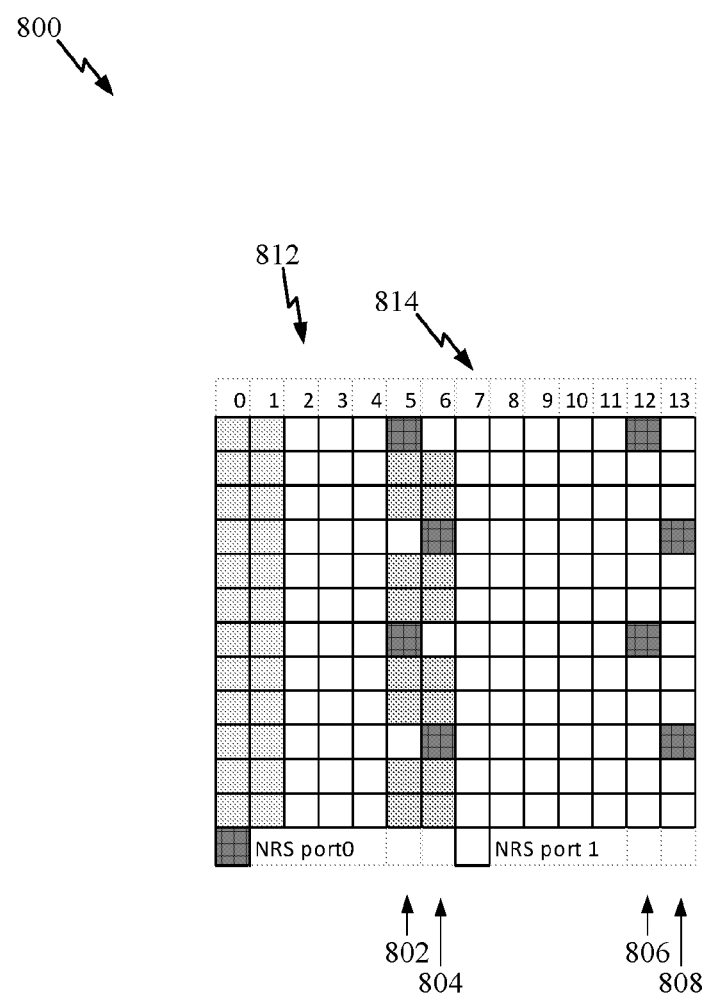
FIG. 8 is an example subframe configuration, in accordance with certain aspects of the present disclosure.

FIG. 8 is an example subframe configuration 800, according to aspects of the present disclosure. In the example subframe configuration 800, the sixth and seventh symbols of the first slot at 802 and 804 are reserved resources not for NB-IoT transmissions. Other resources shown in white at 812 and 814 are not reserved and are available for NB-IoT transmissions, such as NPDCCHs and NPDSCHs. NRSs are transmitted in the sixth and seventh symbols of each slot at 802, 804, 806, and 808, on certain subcarriers, as in a subframe without the finer granularity reserved resources, as discussed in the implementation above (see also the example subframe configuration 300 in FIG. 3). While FIG. 8 is illustrated with NRS and discussed with regard to NPDCCHs or NPDSCHs, it is also applicable to DMRS and MTC transmissions. That is, the sixth and seventh symbols of the first slot at 802 and 804 can be considered reserved resources not for MTC transmissions. Other resources shown in white at 812 and 814 are not reserved and may be considered available for MTC transmissions, such as MTC PDCCHs and MTC PDSCHs. DMRSs may be transmitted in the sixth and seventh symbols of each slot at 802, 804, 806, and 808, on certain subcarriers, as in a subframe without the finer granularity reserved resources, as discussed in the implementation above (see also the example subframe configuration 300 in FIG. 3).

In some implementations of the present disclosure, no NRS transmissions are made in a subframe, if reserved resources comprise one or more NRS symbols. Thus, a UE receiving the subframe would not estimate the narrowband channel based on the subframe, due to the lack of NRSs.

In some implementations of the present disclosure, no DMRS transmissions are made in a subframe, if reserved resources comprise one or more DMRS symbols. Thus, a UE receiving the subframe would ignore MTC transmissions in the subframe, due to the lack of DMRSs.

Figure 9:
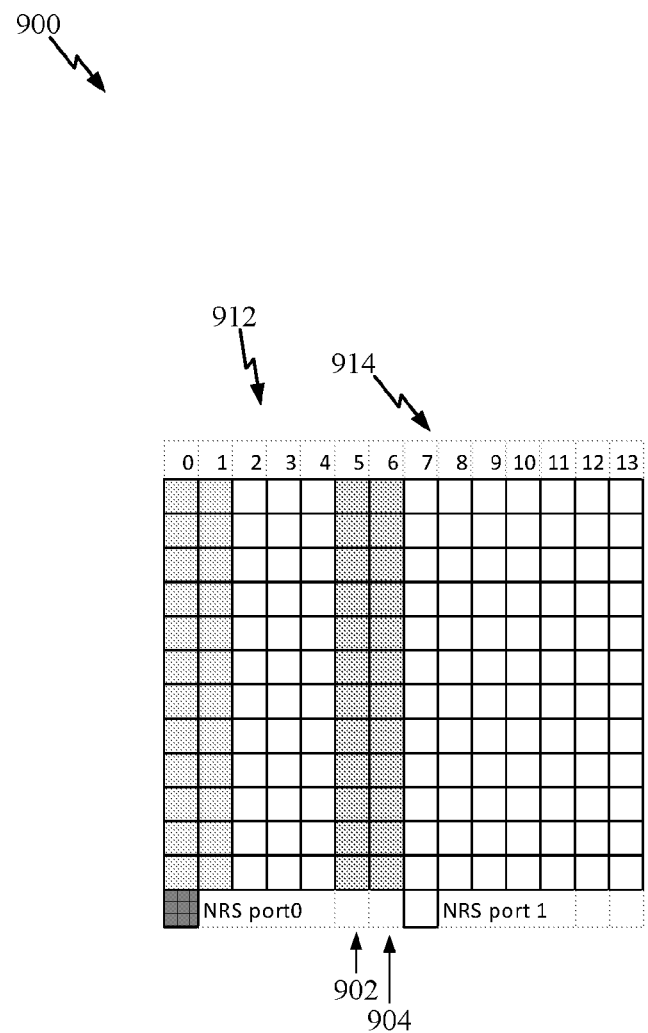
FIG. 9 is an example subframe configuration, in accordance with certain aspects of the present disclosure.

FIG. 9 is an example subframe configuration 900, according to aspects of the present disclosure. In the example subframe configuration 900, the sixth and seventh symbols of the first slot at 902 and 904 are reserved resources not for NB-IoT transmissions. Other resources shown in white at 912 and 914 are not reserved and are available for NB-IoT transmissions, such as NPDCCHs and NPDSCHs. As described in the implementation above, because NRSs are scheduled in the reserved resources, no NRSs are transmitted in the example subframe configuration. While FIG. 9 is illustrated with NRS and discussed with regard to NPDCCHs or NPDSCHs, it is also applicable to DMRS and MTC transmissions. That is, the sixth and seventh symbols of the first slot at 902 and 904 can be considered reserved resources not for MTC transmissions. Other resources shown in white at 912 and 914 are not reserved and may be considered available for MTC transmissions, such as MTC PDCCHs and MTC PDSCHs. As described in the implementation above, because DMRSs are scheduled in the reserved resources, no DMRSs are transmitted in the example subframe configuration, and a UE receiving the subframe would ignore MTC transmissions in the subframe, due to the lack of DMRSs.

In some implementations of the present disclosure, no NRS transmissions are made in a slot of a subframe, if reserved resources in the slot comprise one or more NRS symbols. Thus, a UE receiving the subframe would not estimate the narrowband channel based on the slot lacking the NRSs, due to the lack of NRSs in that slot. The UE could still estimate the narrowband channel based on another slot of the subframe, if the other slot contains NRSs.

In some implementations of the present disclosure, no DMRS transmissions are made in a slot of a subframe, if reserved resources in the slot comprise one or more DMRS symbols. Thus, a UE receiving the subframe could receive an MTC transmission in the slot and another slot of the subframe, if the other slot contains DMRS s.

In some implementations of the present disclosure, NRSs may be configurable, depending on which OFDM symbols in a subframe are available for NB-IoT transmissions, (that is, not reserved non-NB-IoT transmissions). In some of these implementations, if the sixth and seventh symbols of both slots are available, then NRSs are transmitted on the sixth and seventh symbols of both slots. Otherwise, if the third and fourth symbols of both slots are available, then NRSs are transmitted on the third and fourth symbols of both slots. Otherwise, if the sixth and seventh symbols of one slot are available, then NRSs are transmitted on the sixth and seventh symbols of that slot and are not transmitted in the other slot. Otherwise, if the third and fourth symbols of one slot are available, then NRSs are transmitted on the third and fourth symbols of that slot and NRSs are not transmitted in the other slot. Otherwise, NRSs are not transmitted in the subframe.

In some implementations of the present disclosure, DMRSs may be configurable, depending on which OFDM symbols in a subframe are available for MTC transmissions, (that is, not reserved non-MTC transmissions). In some of these implementations, if the sixth and seventh symbols of both slots are available, then DMRSs are transmitted on the sixth and seventh symbols of both slots. Otherwise, if the third and fourth symbols of both slots are available, then DMRSs are transmitted on the third and fourth symbols of both slots. Otherwise, if the sixth and seventh symbols of one slot are available, then DMRSs are transmitted on the sixth and seventh symbols of that slot and are not transmitted in the other slot. Otherwise, if the third and fourth symbols of one slot are available, then DMRSs are transmitted on the third and fourth symbols of that slot and DMRSs are not transmitted in the other slot. Otherwise, DMRSs are not transmitted in the subframe.

Figure 10:
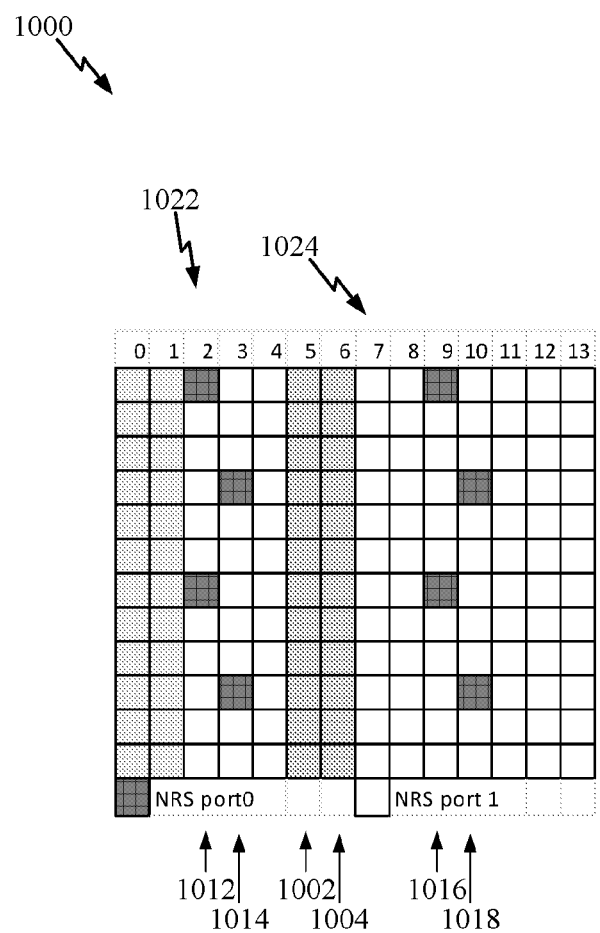
FIG. 10 is an example subframe configuration, in accordance with certain aspects of the present disclosure.

FIG. 10 is an example subframe configuration 1000, according to aspects of the present disclosure. In the example subframe configuration 1000, the sixth and seventh symbols of the first slot at 1002 and 1004 are reserved resources not for NB-IoT transmissions. Other resources shown in white at 1022 and 1024 are not reserved and are available for NB-IoT transmissions, such as NPDCCHs and NPDSCHs. As described in the implementation above, because the sixth and seventh symbols in the first slot are reserved resources not for NB-IoT transmissions, no NRSs are transmitted in those symbols. Also as described in the implementation above, because the third and fourth symbols of both slots are not reserved resources, NRSs are transmitted in the third and fourth symbols of each slot, at 1012, 1014, 1016, and 1018. While FIG. 10 is illustrated with NRS and discussed with regard to NPDCCHs or NPDSCHs, it is also applicable to DMRS and MTC transmissions. That is, the sixth and seventh symbols of the first slot at 1002 and 1004 can be considered reserved resources not for MTC transmissions. Other resources shown in white at 1022 and 1024 are not reserved and may be considered available for MTC transmissions, such as MTC PDCCHs and MTC PDSCHs. As described in the implementation above, because the sixth and seventh symbols in the first slot are reserved resources not for MTC transmissions, no DMRSs are transmitted in those symbols. Also as described in the implementation above, because the third and fourth symbols of both slots are not reserved resources, DMRSs may be transmitted in the third and fourth symbols of each slot, at 1012, 1014, 1016, and 1018.

According to aspects of the present disclosure, for NPDCCHs or NPDSCHs transmitted with repetition or cyclic repetition, RE mapping in a subframe with finer granularity reserved resources is based on the following for supporting coherent combining across subframes with and without finer granularity reserved resources:

1) Resource mapping in the subframe with partial resources (i.e., the subframe with some reserved resources) is the same as resource mapping in a typical DL subframe without reserved resources, with portions of the NPDCCH or NPDSCH transmission mapped to the reserved resources being punctured; that is, reserved resources are counted but are not used for RE mapping.
2) Since a different NRS pattern may be used in a subsequent typical DL subframe in which a repetition of the NPDCCH or NPDSCH is transmitted, the REs in which NRS are transmitted in the typical DL subframe are not used for RE mapping, and the REs containing NRS in the subframe with the partial resources are counted but not used for RE mapping. That is, the NRS in the subframe with the partial resources puncture the NPDCCH or NPDSCH on those REs.
3) The subframe with the partial resources is counted for the number of NPDSCH or NPDCCH repetitions.

Similarly, according to aspects of the present disclosure, for MTC PDCCHs or MTC PDSCHs transmitted with repetition or cyclic repetition, RE mapping in a subframe with finer granularity reserved resources is based on the following for supporting coherent combining across subframes with and without finer granularity reserved resources:
1) Resource mapping in the subframe with partial resources (i.e., the subframe with some reserved resources) is the same as resource mapping in a typical DL subframe without reserved resources, with portions of the MTC PDCCH or MTC PDSCH transmission mapped to the reserved resources being punctured; that is, reserved resources are counted but are not used for RE mapping.
2) Since a different DMRS pattern may be used in a subsequent typical DL subframe in which a repetition of the MTC PDCCH or MTC PDSCH is transmitted, the REs in which DMRS are transmitted in the typical DL subframe are not used for RE mapping, and the REs containing DMRS in the subframe with the partial resources are counted but not used for RE mapping. That is, the DMRS in the subframe with the partial resources puncture the MTC PDCCH or MTC PDSCH on those REs.
3) The subframe with the partial resources is counted for the number of MTC PDSCH or MTC PDCCH repetitions.

Figure 11:
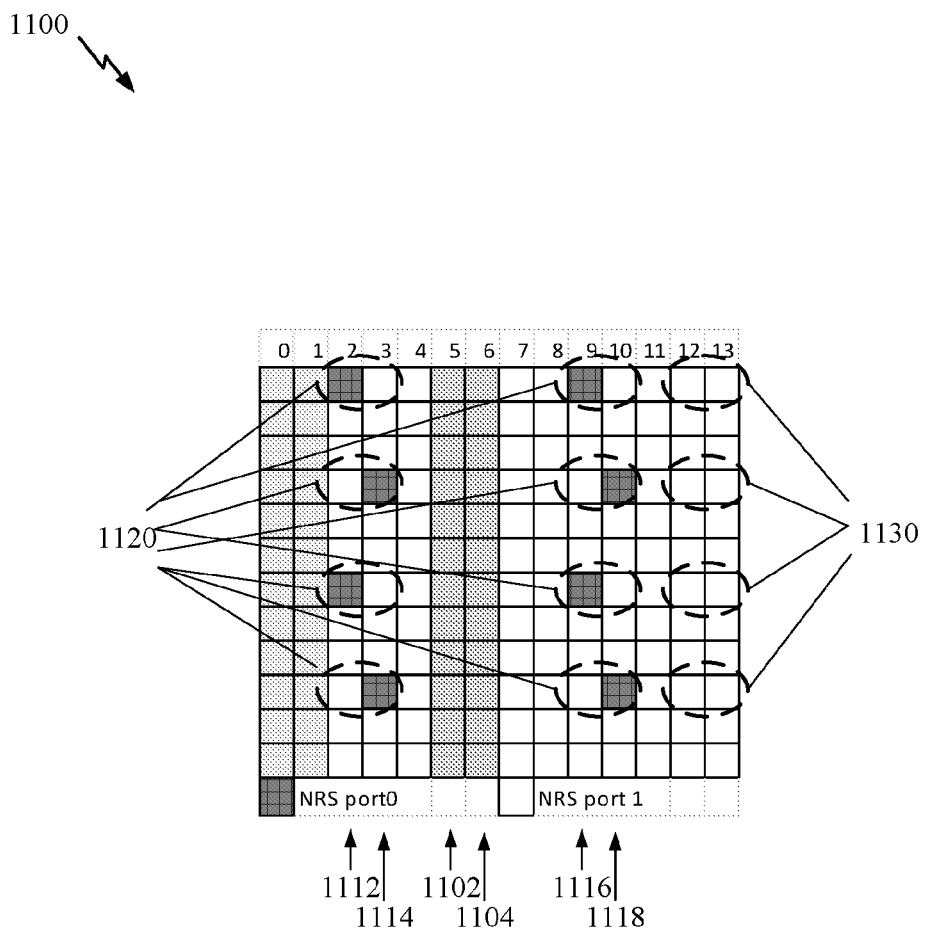
FIG. 11 is an example subframe configuration, in accordance with certain aspects of the present disclosure.

FIG. 11 is an example subframe configuration 1100, according to aspects of the present disclosure. In the example subframe configuration 1100, the sixth and seventh symbols of the first slot at 1102 and 1104 are reserved resources not for NB-IoT transmissions. As described in the implementation above, because the sixth and seventh symbols in the first slot are reserved resources not for NB-IoT transmissions, no NRSs are transmitted in those symbols. Also as described in the implementation above, because the third and fourth symbols of both slots are not reserved resources, NRSs are transmitted in the third and fourth symbols of each slot, at 1112, 1114, 1116, and 1118. As described above, for NPDCCHs or NPDSCHs transmitted with repetition in the illustrated subframe, the REs 1120 containing NRSs in the subframe are counted toward the mapping of the NPDCCH or NPDSCH, but the NRSs puncture the NPDCCH or NPDSCH on those REs. Also as described above, the REs in the reserved resources at 1102 and 1104 are counted toward the mapping of the NPDCCH or NPDSCH, but the NPDCCH or NPDSCH is punctured on those reserved resources. And, as described above, the REs 1130 in which NRS are transmitted in the typical DL subframe are not used for mapping of the NPDCCH or NPDSCH. While FIG. 11 is illustrated with NRS and discussed with regard to NPDCCHs or NPDSCHs, it is also applicable to DMRS and MTC transmissions. That is, the sixth and seventh symbols of the first slot at 1102 and 1104 can be considered reserved resources not for MTC transmissions. As described in the implementation above, because the sixth and seventh symbols in the first slot are reserved resources not for MTC transmissions, no DMRSs are transmitted in those symbols. Also as described in the implementation above, because the third and fourth symbols of both slots are not reserved resources, DMRSs may be transmitted in the third and fourth symbols of each slot, at 1112, 1114, 1116, and 1118. As described above, for MTC PDCCHs or MTC PDSCHs transmitted with repetition in the illustrated subframe, the REs 1120 containing DMRSs in the subframe are counted toward the mapping of the MTC PDCCH or the MTC PDSCH, but the DMRSs puncture the MTC PDCCH or MTC PDSCH on those REs. Also as described above, the REs in the reserved resources at 1102 and 1104 are counted toward the mapping of the MTC PDCCH or MTC PDSCH, but the MTC PDCCH or MTC PDSCH is punctured on those reserved resources. And, as described above, the REs 1130 in which DMRS are transmitted in the typical DL subframe are not used for mapping of the MTC PDCCH or MTC PDSCH.

Figure 12:
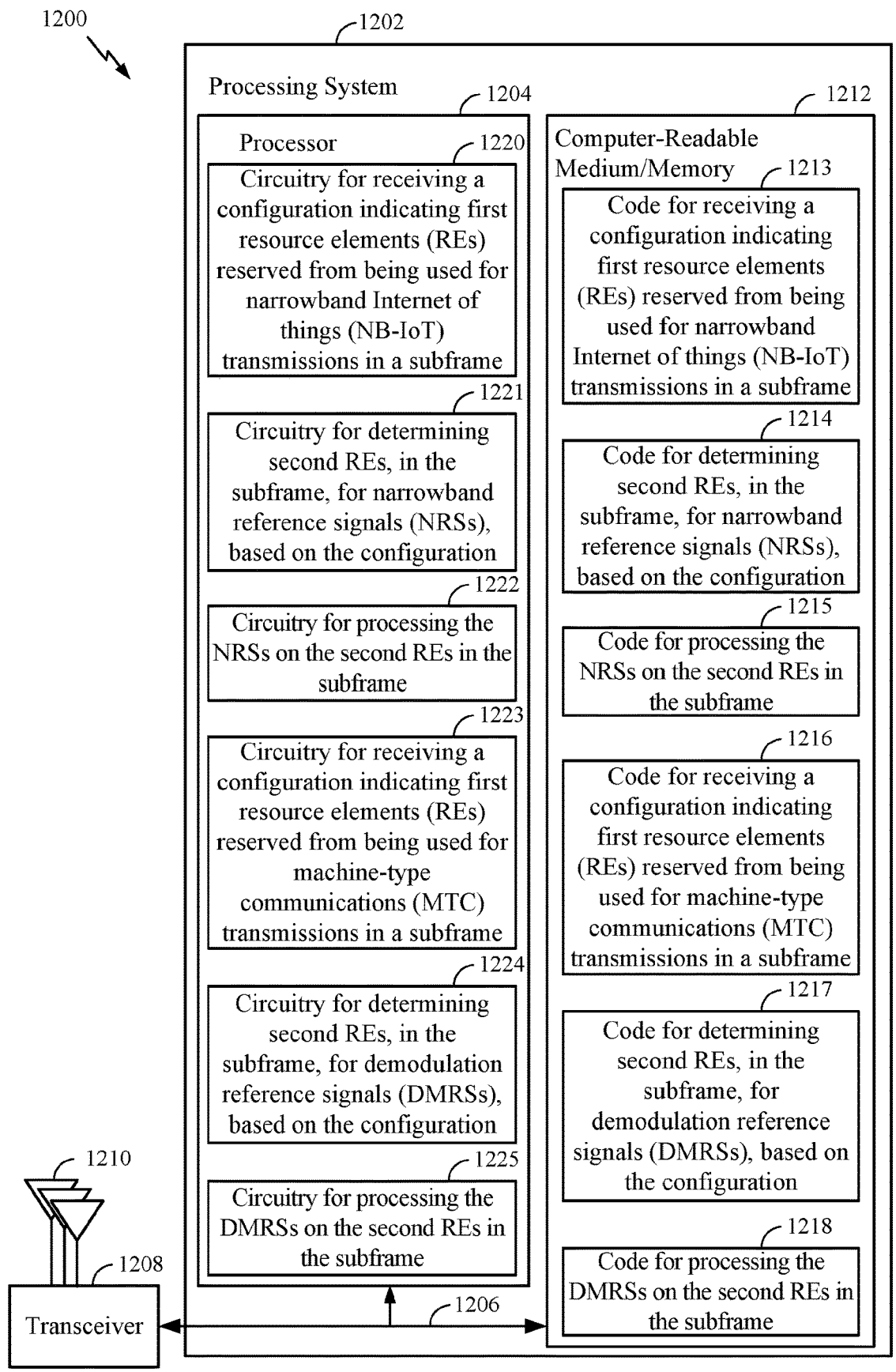
FIG. 12 illustrates a communications device that may include various components configured to perform the operations shown in FIGS. 4 and 6.

FIG. 12 illustrates a communications device 1200 that may include various components (e.g., corresponding to means-plus-function components) configured to perform operations for the techniques disclosed herein, such as the operations illustrated in FIGS. 4 and 6. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIGS. 4 and 6, or other operations for performing the various techniques discussed herein for processing NRSs in subframes having resources reserved from being used for narrowband transmissions. In certain aspects, computer-readable medium/memory 1212 stores code 1213 for receiving a configuration indicating first resource elements (REs) reserved from being used for narrowband Internet of things (NB-IoT) transmissions in a subframe; code 1214 for determining second REs, in the subframe, for narrowband reference signals (NRSs), based on the configuration; code 1215 for processing the NRSs on the second REs in the subframe; code 1216 for receiving a configuration indicating first resource elements (REs) reserved from being used for machine-type communications (MTC) transmissions in a subframe; code 1217 for determining second REs, in the subframe, for demodulation reference signals (DMRSs), based on the configuration; and code 1218 for processing the DMRSs on the second REs in the subframe. In certain aspects, the processor 1204 has circuitry configured to implement the code stored in the computer-readable medium/memory 1212. The processor 1204 includes circuitry 1220 for receiving a configuration indicating first resource elements (REs) reserved from being used for Internet of things (NB-IoT) transmissions in a subframe;

circuitry 1221 for determining second REs, in the subframe, for narrowband reference signals (NRSs), based on the configuration; circuitry 1222 for processing the NRSs on the second REs in the subframe; circuitry 1223 for receiving a configuration indicating first resource elements (REs) reserved from being used for machine-type communications (MTC) transmissions in a subframe; circuitry 1221 for determining second REs, in the subframe, for demodulation reference signals (DMRSs), based on the configuration; and circuitry 1222 for processing the DMRSs on the second REs in the subframe.

Figure 13:
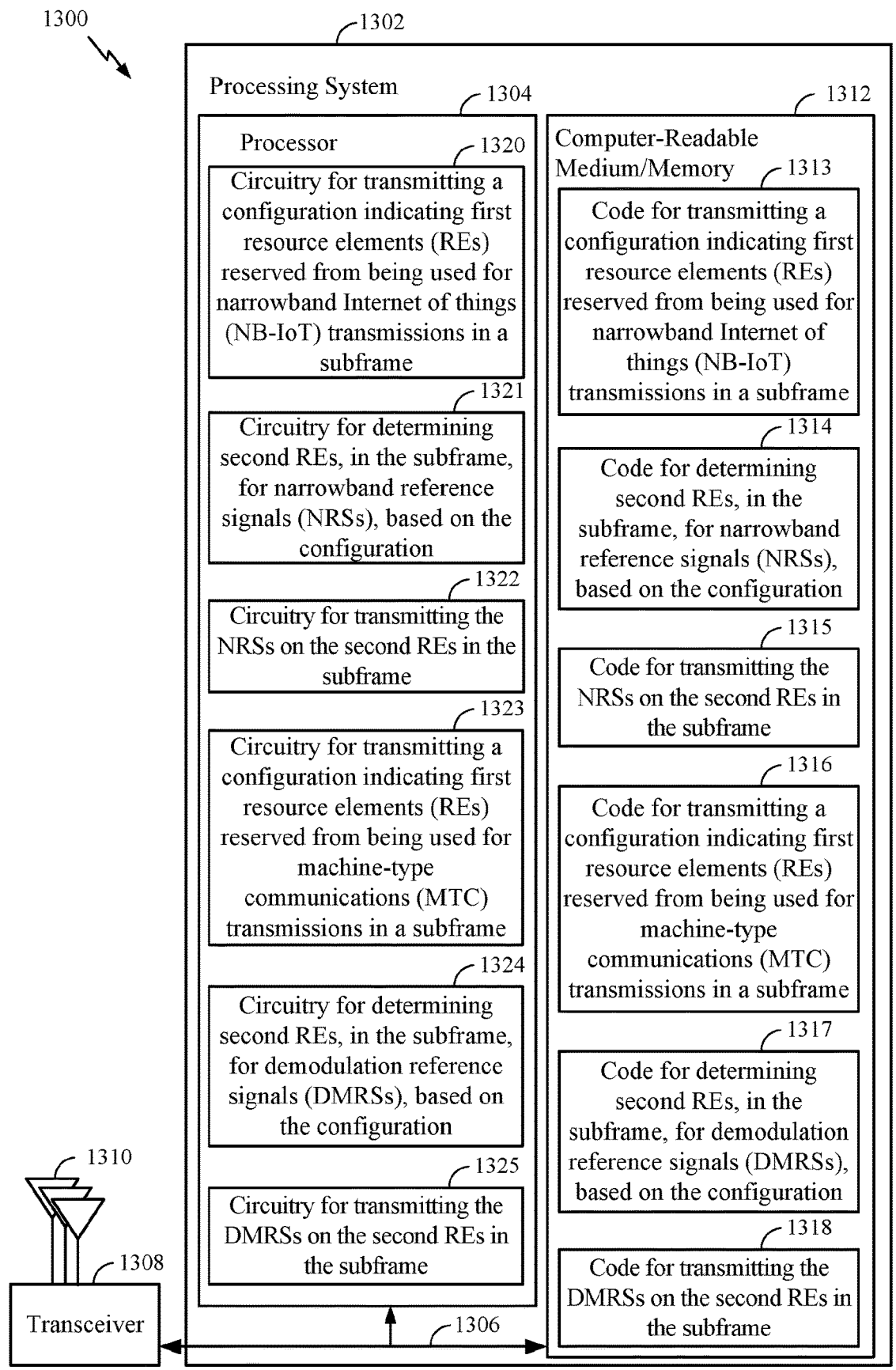
FIG. 13 illustrates a communications device that may include various components configured to perform the operations shown in FIGS. 5 and 7.

FIG. 13 illustrates a communications device 1300 that may include various components (e.g., corresponding to means-plus-function components) configured to perform operations for the techniques disclosed herein, such as the operations illustrated in FIGS. 5 and 7. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIGS. 5 and 7, or other operations for performing the various techniques discussed herein for transmitting narrowband reference signals (NRSs) in subframes having resources reserved from being used for narrowband transmissions. In certain aspects, computer-readable medium/memory 1312 stores code 1313 for transmitting a configuration indicating first resource elements (REs) reserved from being used for narrowband Internet of things (NB-IoT) transmissions in a subframe; code 1314 for determining second REs, in the subframe, for narrowband reference signals (NRSs), based on the configuration; code 1315 for transmitting the NRSs on the second REs in the subframe; code 1316 for transmitting a configuration indicating first resource elements (REs) reserved from being used for machine-type communications (MTC) transmissions in a subframe; code 1317 for determining second REs, in the subframe, for demodulation reference signals (DMRSs), based on the configuration; and code 1318 for transmitting the DMRSs on the second REs in the subframe. In certain aspects, the processor 1304 has circuitry configured to implement the code stored in the computer-readable medium/memory 1312. The processor 1304 includes circuitry 1320 for transmitting a configuration indicating first resource elements (REs) reserved from being used for narrowband Internet of things (NB-IoT) transmissions in a subframe; circuitry 1321 for determining second REs, in the subframe, for narrowband reference signals (NRSs), based on the configuration; circuitry 1322 for transmitting the NRSs on the second REs in the subframe; circuitry 1323 for transmitting a configuration indicating first resource elements (REs) reserved from being used for machine-type communications (MTC) transmissions in a subframe; circuitry 1324 for determining second REs, in the subframe, for demodulation reference signals (DMRSs), based on the configuration; and circuitry 1325 for transmitting the DMRSs on the second REs in the subframe.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), the method comprising:
receiving a configuration indicating one or more slots reserved from being used for narrowband Internet of things (NB-IoT) transmissions in a subframe, wherein the one or more slots include one or more symbols configured for one or more narrowband reference signal (NRS) transmissions;
determining, based on the configuration, none or all of the one or more symbols for processing the one or more NRS transmissions, wherein determining the none or all of the one or more symbols comprises determining none of the one or more symbols for processing the one or more NRS transmissions based on the one or more slots reserved from being used for NB-IoT transmissions including the one or more symbols configured for the one or more NRS transmissions; and
processing the one or more symbols configured for the one or more NRS transmissions in the subframe based on the determination, wherein processing the one or more symbols configured for the one or more NRS transmissions in the subframe comprises refraining from estimating a channel based on the determination of none of the one or more symbols for processing the one or more NRS transmissions.

2. The method of claim 1, wherein:
determining the none or all of the symbols comprises determining all of the one or more symbols for processing the one or more NRS transmissions based on the one or more slots reserved from being used for NB-IoT transmissions including the one or more symbols configured for the one or more NRS transmissions;
processing the one or more symbols configured for the one or more NRS transmissions in the subframe comprises receiving the one or more NRS transmissions on all of the one or more symbols configured for the one or more NRS transmissions in the subframe; and
the method further comprises ignoring downlink NB-IoT transmissions other than the one or more NRS transmissions in the one or more symbols.

3. The method of claim 1, further comprising receiving one or more repetitions of a narrowband physical downlink control channel (NPDCCH) or a narrowband physical downlink shared channel (NPDSCH) transmission in the subframe and a subsequent subframe.

4. The method of claim 3, further comprising determining one or more resources of the subframe and the subsequent subframe for the NPDCCH or the NPDSCH transmission based on a default NRS configuration, wherein transmission of the NPDCCH or the NPDSCH in the subframe is punctured on the one or more symbols.

5. A method of wireless communications by a user equipment (UE), the method comprising:
receiving a configuration indicating one or more slots reserved from being used for machine-type communications (MTC) transmissions in a subframe, wherein the one or more slots include one or more symbols configured for one or more demodulation reference signal (DMRS) transmissions;
determining, based on the configuration, none or all of the one or more symbols for processing the one or more DMRS transmissions, wherein determining the none or all of the one or more symbols comprises determining none of the one or more symbols for processing the one or more DMRS transmissions based on the one or more slots reserved from being used for MTC transmissions including the one or more symbols configured for the one or more DMRS transmissions; and
processing the one or more symbols configured for the one or more DMRS transmissions in the subframe based on the determination, wherein processing the one or more symbols configured for the one or more DMRS transmissions in the subframe comprises ignoring an MTC transmission in the subframe.

6. The method of claim 5, wherein:
determining the none or all of the symbols comprises determining all of the one or more symbols for processing the one or more DMRS transmissions based on the one or more slots reserved from being used for MTC transmissions including the one or more symbols configured for the one or more DMRS transmissions;
processing the one or more symbols configured for the one or more DMRS transmissions in the subframe comprises receiving the one or more DMRS transmissions on all of the one or more symbols configured for the one or more DMRS transmissions in the subframe; and
the method further comprises ignoring downlink MTC transmissions other than the one or more DMRS transmissions in the one or more symbols.

7. The method of claim 5, further comprising receiving one or more repetitions of an MTC physical downlink control channel (PDCCH) or an MTC physical downlink shared channel (PDSCH) transmission in the subframe and a subsequent subframe.

8. The method of claim 7, further comprising determining one or more resources of the subframe and the subsequent subframe for the MTC PDCCH or the MTC PDSCH transmission based on a default DMRS configuration, wherein transmission of the MTC PDCCH or in the subframe is punctured on the one or more symbols.

9. A user equipment (UE), comprising:
memory storing computer-executable code; and
one or more processor configured to, individually or collectively, execute the computer-executable code and cause the UE to:
receive a configuration indicating one or more slots reserved from being used for narrowband Internet of things (NB-IoT) transmissions in a subframe, wherein the one or more slots include one or more symbols configured for one or more narrowband reference signal (NRS) transmissions;
determine, based on the configuration, none or all of the one or more symbols for processing the one or more NRS transmissions, wherein determining the none or all of the one or more symbols comprises determining none of the one or more symbols for processing the one or more NRS transmissions based on the one or more slots reserved from being used for NB-IoT transmissions including the one or more symbols configured for the one or more NRS transmissions; and
process the one or more symbols configured for the one or more NRS transmissions in the subframe based on the determination, wherein processing the one or more symbols configured for the one or more NRS transmissions in the subframe comprises refraining from estimating a channel based on the determination of none of the one or more symbols for processing the one or more NRS transmissions.

10. The UE of claim 9, wherein the one or more processors are configured to, individually or collectively, execute the computer-executable code and cause the UE to ignore downlink NB-IoT transmissions other than the one or more NRS transmissions in the one or more symbols.

11. A user equipment (UE), comprising:
memory storing computer-executable code; and
one or more processor configured to, individually or collectively, execute the computer-executable code and cause the UE to:
receive a configuration indicating one or more slots reserved from being used for machine-type communications (MTC) transmissions in a subframe, wherein the one or more slots include one or more symbols configured for one or more demodulation reference signal (DMRS) transmissions;
determine, based on the configuration, none or all of the one or more symbols for processing the one or more DMRS transmissions, wherein determining the none or all of the one or more symbols comprises determining none of the one or more symbols for processing the one or more DMRS transmissions based on the one or more slots reserved from being used for MTC transmissions including the one or more symbols configured for the one or more DMRS transmissions; and
process the one or more symbols configured for the one or more DMRS transmissions in the subframe based on the determination, wherein processing the one or more symbols configured for the one or more DMRS transmissions in the subframe comprises ignoring an MTC transmission in the subframe.

12. The UE of claim 11, wherein the one or more processors are configured to, individually or collectively, execute the computer-executable code and cause the UE to ignore downlink MTC transmissions other than the one or more DMRS transmissions in the one or more symbols.

* * * * *